(12) United States Patent
Orchard

(10) Patent No.: US 8,225,571 B2
(45) Date of Patent: Jul. 24, 2012

(54) DECK FASTENER, SYSTEM AND METHOD OF USE

(76) Inventor: Brian Orchard, London (CA)

(*) Notice: Subject to any disclaimer, the term of this patent is extended or adjusted under 35 U.S.C. 154(b) by 0 days.

(21) Appl. No.: 11/857,657

(22) Filed: Sep. 19, 2007

(65) Prior Publication Data

US 2008/0066417 A1 Mar. 20, 2008

Related U.S. Application Data

(60) Provisional application No. 60/826,162, filed on Sep. 19, 2006.

(51) Int. Cl.
 *E04B 2/30* (2006.01)
 *E04B 2/00* (2006.01)
 *E04B 1/38* (2006.01)

(52) U.S. Cl. ........ 52/489.1; 52/483.1; 52/712; 52/582.1

(58) Field of Classification Search ............ 52/489.2, 52/578, 581, 582.1, 586.1, 586.2, 480, 483.1, 52/489.1, 650.3, 553, 391, 392, 285.3, 293.3, 52/712, 655.1
See application file for complete search history.

(56) References Cited

U.S. PATENT DOCUMENTS

| | | | | | |
|---|---|---|---|---|---|
| 1,898,364 | A | * | 2/1933 | Gynn | 52/512 |
| 2,817,125 | A | * | 12/1957 | Johns | 52/512 |
| 2,848,758 | A | * | 8/1958 | Chisholm | 52/364 |
| 2,880,481 | A | * | 4/1959 | Robinson, Jr. | 52/512 |
| 4,255,914 | A | * | 3/1981 | Seipos | 52/489.2 |
| 4,831,808 | A | * | 5/1989 | Wynar | 52/715 |
| 5,027,573 | A | * | 7/1991 | Commins et al. | 52/489.2 |
| 5,497,593 | A | * | 3/1996 | Riesberg | 52/702 |
| 5,775,048 | A | | 7/1998 | Orchard | |
| 6,237,295 | B1 | * | 5/2001 | Ballard | 52/589.1 |
| 6,418,693 | B2 | * | 7/2002 | Ballard | 52/589.1 |
| 7,748,187 | B2 | * | 7/2010 | Sensenig | 52/489.1 |
| 2001/0015042 | A1 | * | 8/2001 | Ballard | 52/589.1 |
| 2010/0146900 | A1 | * | 6/2010 | Holland | 52/650.3 |
| 2010/0205895 | A1 | * | 8/2010 | Orchard | 52/712 |

FOREIGN PATENT DOCUMENTS

CA 2154035 12/2005

OTHER PUBLICATIONS

Invis-Fast Hidden Deck System, Sep. 18, 2006, available at htt:// www.glaciershowgurad.com/invisifast. The IPE Clip Company Manufactures of Hidden Deck Fasteners and Accessories, Hand Clip Brand Fasteners, Sep. 18, 2006, available at http://ww.ipeclip.com.
Lumber Loc Installation Instructions, Lumber Loc Exotic Hardwood and Composite Fastener Installation Instruction, Sep. 18, 2006, available at http://www.lumberloc.com/extinst.htm.
Eb-Ty-Installation, Dock installation instructions using EB-TY Hidden Deck Fasteners, Sep. 18, 2006, available at http://www.ebty.com/eb-ty-installation.html.

* cited by examiner

*Primary Examiner* — Jessica Laux
*Assistant Examiner* — Ryan Kwiecinski

(57) ABSTRACT

A device for fastening first and second structural members, typically decking joists and planks has a generally planar base plate with first and second ends and a thickness. A first vertical tab is integral with, and bent upwardly along a first bend line from an interior portion of the base plate. The bend occurs in a first direction to form a first interior angle between the first vertical tab and the second end of the base plate. A first fastener-receiving hole is positioned in the first vertical tab. A second fastener-receiving hole is positioned in the base plate between the first bend line and the second end. The first interior angle is in the range of about 85 to 90° along the first bend line. The base plate is generally trapezoidal, with a width that decreases from the first end to the second end.

5 Claims, 3 Drawing Sheets

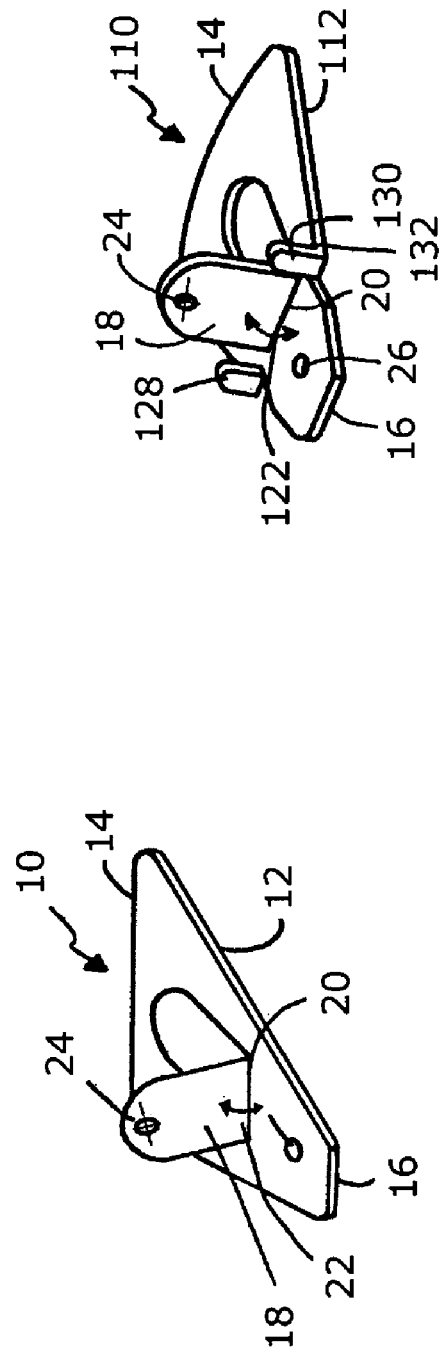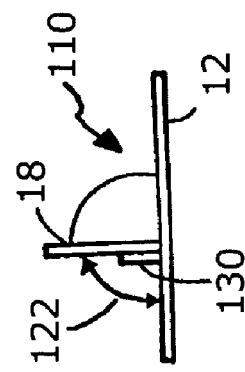

DECK FASTENER, SYSTEM AND METHOD OF USE

CROSS-REFERENCE TO RELATED APPLICATIONS

This application is a non-provisional of U.S. Ser. No. 60/826,162, filed Sep. 19, 2006, which is incorporated by reference as if fully recited herein.

TECHNICAL FIELD

The invention relates to an under deck fastening system and method, in addition, to a deck fastener which can be used to "invisibly" attach a deck board to a supporting joist-like structure.

BACKGROUND OF THE ART

There are a variety of decking systems on the market today. Most of the decking systems utilize some sort of fastening means; may it be a screw, nail or staple to attach the decking members to the underlying joists. Furthermore, with most decking systems, the fastening means is installed directly through the top face of the decking members to the joist below. In addition, there are decking systems that employ plates to attach decking members to joists. However, these decking systems have some major drawbacks.

The common method of securing the decking members to the underlying joists by directly fastening the decking member to the joist through the top face of the decking member has many drawbacks. First, the fastening means are visible and this leads to many shortcomings: the heads of the fastening means are unattractive and take away from the façade of the natural wood, the fastening means may rust and discolor the decking members, the fastening means may work loose and become a safety hazard to persons walking on top of the decking structure, finally hammer blows to decking surface during installation may cause depressions that collect water. The collection of water may lead to splintering of the decking members, mold growth and the propagation of cracks starting at where the fastener installation occurs.

Another problem with this common method is that installation may become problematic because one cannot see exactly where the joists lie underneath the decking member. Therefore, numerous times during installation of the decking members, the person installing the deck may miss a joist or only partially strike a joist and have to back out the fastening means or leave the fastening means in the decking member and install yet another fastening means to secure the decking member to the joist. Once again, this problems leads to the aforementioned problems with visible fastening means.

Another shortcoming of the most common method of deck installation is that after a period time the decking members may loosen and move. The movement of the decking members causes problems. First, the decking does not keep its uniform look, which results in loss of aesthetic appeal. In addition, the decking members may move enough to cause the loss of the sought after gaps between the installed decking members. If the gaps between the decking members disappear, there is nowhere for rainwater or other liquids to drain from the decking structure. Yet again, this leads to the aforementioned problem of mold and discoloration of the decking members due to rusting of the fastening members.

The current deck systems that use plates have some major drawbacks. First, with most deck systems that use plates, the fasteners are secured upwards from underneath the decking member. This makes installation and maintenance troublesome because the person installing or maintaining the deck must work from underneath the deck. This situation is especially troublesome with decking that is situated close to the ground and is hard to reach from underneath the decking members.

Additionally, the current deck systems are flawed because when the fasteners are attached through the decking members from the underside of decking members, the ends of the fasteners may protrude through the top face of the decking members if the fasteners are not precisely sized. This situation puts persons walking on top of the decking structure at serious risk for stepping on protruding nails, screws and other fasteners.

SUMMARY OF THE INVENTION

Accordingly, an object of some exemplary embodiments is to provide a decking installation system, method and device with a cost effective means of manufacture. This is accomplished because the system only requires one style of device for fastening. Therefore, it is very cost effective to manufacture the decking installation system. Furthermore, the system is hidden because no part of the fasteners is able to be seen from the decking surface.

Another object of some exemplary embodiments is that the decking members are easy to install. This is especially true with regards to decks that are situated close to the ground and have limited access to the underside of the decking members. With this system, there is no need to access the underside of the decking members for installation or maintenance.

Additionally, the exemplary embodiments facilitate straightforward installation and maintenance because the embodiments position and maintain the proper spacing among the decking members. This eliminates the need to use spacers during installation. Moreover, the person installing or maintaining the decking members will not have to use a hammer, etc. to strike the decking members into place.

Since the proper spacing of the decking members is maintained at all times, the exemplary embodiments promote appropriate aeration around the decking members. The proper spacing that promotes appropriate aeration is maintained between both the multiple decking members and between the decking members and the joists. Appropriate aeration helps maintain low levels of mold and fungus growth on the decking members.

Another advantage of the exemplary embodiments is that since the proper spacing between decking members is maintained, the decking members are virtually locked into position and are unable to shift longitudinally over time. Constant proper spacing results in fewer accidents with deck-goers injuring themselves do to loose boards. Furthermore, even if the fastening devices do work loose, the fastening devices are unable to injure deck-goers by protruding from the decking members because the fastening devices are hidden.

Last, the exemplary embodiments do not produce indentations or impressions on the surface of the decking boards during installation or maintenance. There is no need to hammer down fastening devices on the exposed surface of the decking boards because the fastening devices are hidden. The lack or indentations or impressions results in a reduction of discoloration of the decking members, of splintering of the decking members and of mold development.

It should be noted that while all of the above descriptions refer to the installation and maintenance of decking, the exemplary embodiments relate to other systems and methods within the realm of constructing structures. Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which identical parts are identified by identical part numbers and in which:

FIG. 1 is a perspective view of a first embodiment of the fastening device;

FIG. 2 is a perspective view of a second embodiment of the fastening device;

FIG. 3 is a side elevation view of the second embodiment fastening device; and

DESCRIPTION OF PREFERRED EMBODIMENTS

Figure 4:
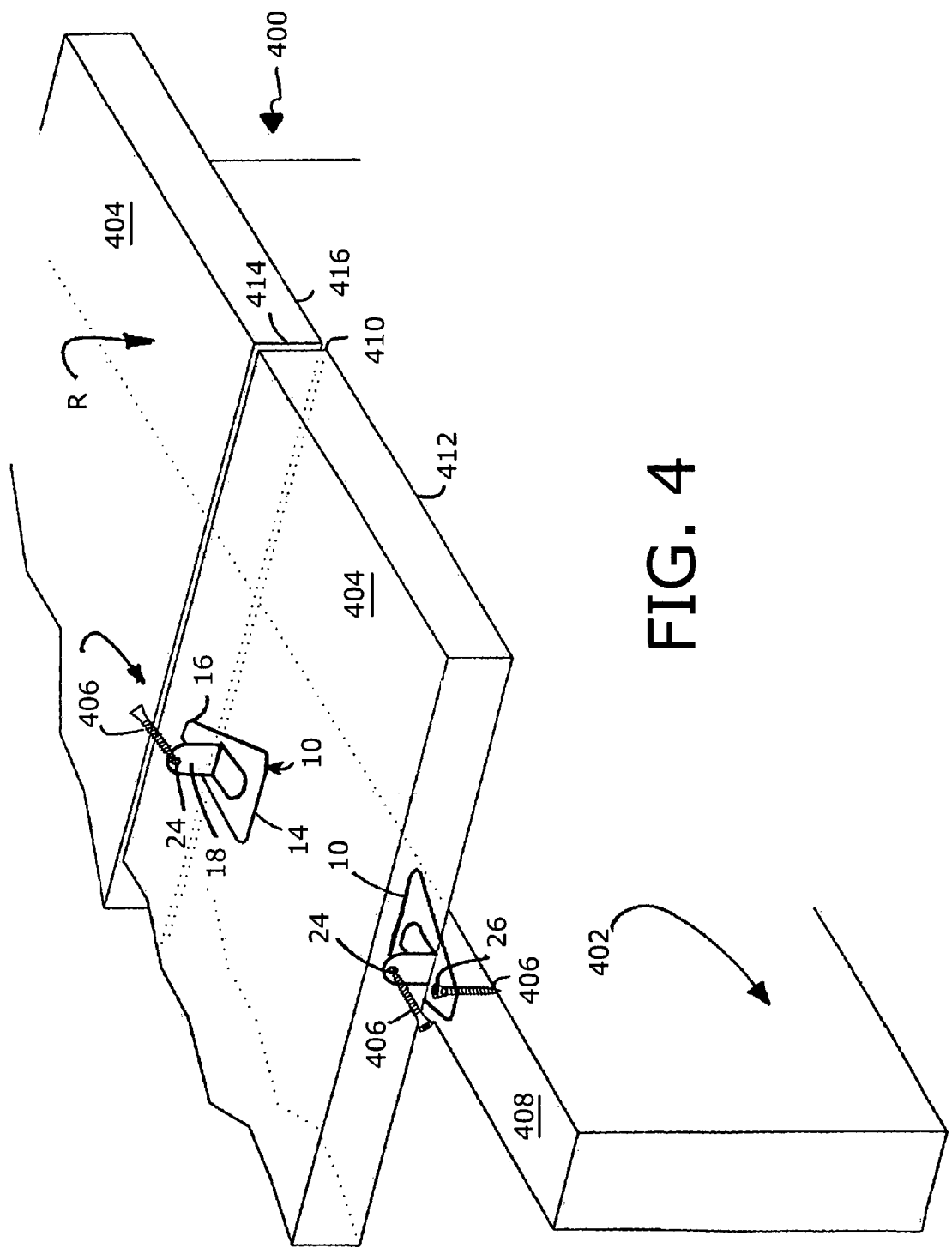
FIG. 4 is a perspective view of a decking system assembled using the first embodiment fastening device.

Referring to FIG. 1, a perspective view of a first embodiment deck fastening device 10 is shown. The fastening device 10 has a base plate 12. In this embodiment, base plate 12 is generally trapezoidal in plan view and has a first end 14 and a second end 16. The base plate 12 has a generally uniform thickness, with a width that decreases from the first end 14 to the second end 16. In the first embodiment device 10, the base plate 12 is planar.

A first vertical tab 18 is integral with, and bent upwardly along a first bend line 20 from an interior portion of the base plate 12. The bend is made transverse to the base plate, and in FIG. 1, is made in a counterclockwise direction to form a first interior angle 22 between the first vertical tab 18 and the second end 16. A first fastener-receiving hole 24 is positioned in the first vertical tab 18. A second fastener-receiving hole 26 is positioned in the base plate 12 between the first bend line 20 and the second end 16.

FIG. 2 shows a perspective view of a second embodiment device 110. Base plate 112 of the fastening device 110 is also generally trapezoidal in plan view and has a first end 14 and a second end 16. The base plate 12 has a generally uniform thickness, with a width that decreases from the first end 14 to the second end 16.

A first vertical tab 18 is integral with, and bent upwardly along a first bend line 20 from an interior portion of the base plate 12. The bend is made transverse to the base plate, and in FIG. 2, is made in a counterclockwise direction to form a first interior angle 122 between the first vertical tab 18 and the second end 16. A first fastener-receiving hole 24 is positioned in the first vertical tab 18. A second fastener-receiving hole 26 is positioned in the base plate 12 between the first bend line 20 and the second end 16.

The second embodiment device 110 differs from the first embodiment in a few different aspects. As seen in FIGS. 2 and 3, the second embodiment device 110 includes second and third vertical tabs 128, 130. These tabs 128, 130 are in addition to and not in lieu of the first vertical tab 18. Each of these additional vertical tabs 128, 130 is integral with, and bent upwardly along a bend line, although the material from which these tabs are formed is taken along one of the side edges of the base plate 112; rather than using an interior portion of the base plate. In the embodiment shown in FIGS. 2 and 3, the second and third vertical tabs 128, 130 have associated second and third bend lines (second bend line is not visible in FIG. 2 or 3, but third bend line 134 is visible). The direction of bending is opposite that for the first vertical tab, so the illustrated embodiment shows the second and third vertical tabs 128, 130 as being bent in a clockwise manner out of the base plate material. For this reason, the respective second and third interior angles are formed between the respective second and third vertical tabs 128, 130 and the first end 14 of the base plate. The second and third bend lines are co-linear. They are positioned co-linear with the first bend line 120 (as shown) or parallel to the first bend line at a position between the first bend line and the second end 16. The distance between the first bend line 120 and the second/third bend line can be used to predetermine the spacing of adjacent decking members when the fastening device 110 is used.

A second difference between the illustrated embodiments 10, 110 is best seen by reference to FIG. 3. While the FIG. 1 device 10 has a planar base plate 12 and the vertical tab 18 projects upwardly in a substantially perpendicular manner, the first interior angle 122 of the second embodiment device is in the range of about 85 to about 88° along the first bend line 120. The preferred manner of achieving this slightly smaller angle is to bend the second end 16 upwardly in a clockwise manner along the first bend line 120. By decreasing the first interior angle, some tension is placed on the device as the fasteners are tightened to the essentially perpendicular surfaces of the decking members, providing assistance in preventing back out of the fastener. Further, the first and second fastener-receiving holes may be countersunk for engaging a head of the fastener. While shown only in connection with the second embodiment device 110, the reduced interior angle is easily accomplished with the first embodiment device 10.

Use of the device 10 to provide a decking system 400 is illustrated in FIG. 4. The decking system 400 has a plurality of joists 402, a plurality of decking members 404, a plurality of the fastening devices 10 and a plurality of fasteners 406. The joists 402 are laid out in a spaced-apart relationship, although FIG. 4 shows only a single joist. The decking members 404 are fastened in a spaced-apart side-by-side manner to an upper surface 408 of the joists 402 using the fastening devices 10 and the fasteners 406. The assembly is done such that the base plate 12 of each fastening device 10 is fastened to one of the upper joist surfaces 408 and the first vertical tab 18 is attached to a side face of one of the decking members 404, so the spacing between adjacent decking members is determined by the thickness of the first vertical tab. If the fastening device 110 would be used instead, the spacing between adjacent decking members 404 would be determined by the combined thicknesses of the first and second vertical tabs 18, 128, plus any distance between the respective first and second bend lines 120, 132.

FIG. 4 also illustrates a method for assembling the decking system 400. A base comprising a plurality of spaced-apart joists 402 is provided first, in a manner that will be readily known. Each joist 402 has an upper surface 408. A first decking member (of the type shown as 404) is positioned across the base of joists 402 atop the upper surface. This first decking member is shown in FIG. 4 as R, referring to its role as a reference member. It may be affixed by any known fastening means.

Once the reference decking member R is in place, a second decking member 404 is prepared for use by affixing a plurality of the fastening devices 10 along a first side 410 of the second decking member, using a fastener 406 that passes through the first fastener-receiving hole 24 such that the first vertical tab 18 is fastened to the first side 410 and the first end 14 abuts a bottom surface 412 of the second decking member. The second end 16 of each fastening device 10 extends outwardly from the second decking member 404. Preferably, these fastening devices 10 are positioned along the length of the first side 410 so that they will not coincide with a joist 402 when placed adjacent to the reference decking member R. After aligning the second decking member 404 into this proper spacing from the reference member R by positioning the first side 410 of the second decking member 404 adjacent to a side 414 of the reference member, the respective second ends 16 of the fastening devices 10 on the second decking member 404 abut a bottom surface 416 of the reference member R. The spacing between the second decking member 404 and the reference member R is set by the thickness of the first vertical tab 18 of the fastening device 10. Also, the fastening device 10 used is selected so that the first vertical tab 18 is shorter than the height of the side 410 of the decking member, assuring that the vertical tab will be effectively hidden from view in use.

At this point, the second decking member 404 is fixed in this position adjacent the reference member R by attaching a further plurality of the fastening devices 10 along a second side 416 of the second decking member 404. In this case, the fastener 406 passes through the first fastener-receiving hole 24 such that the first vertical tab 18 of each fastening device is fastened to the second side 416 and the first end 14 is interposed between a bottom surface 412 of the second decking member 404 and one of the joists 402, with the second end 16 of each fastening device extending outwardly from the second decking member along the second side face atop one of the joists. Then, a fastener 406 is placed through the second fastener-receiving hole 26 to fasten the device 10 to the joist 402.

Additional decking members 404 are added to this structure 400 by placing a first side of the additional decking member along an attached second side of previously attached decking member by repeating the attaching step used with the second decking member.

Figure 5:
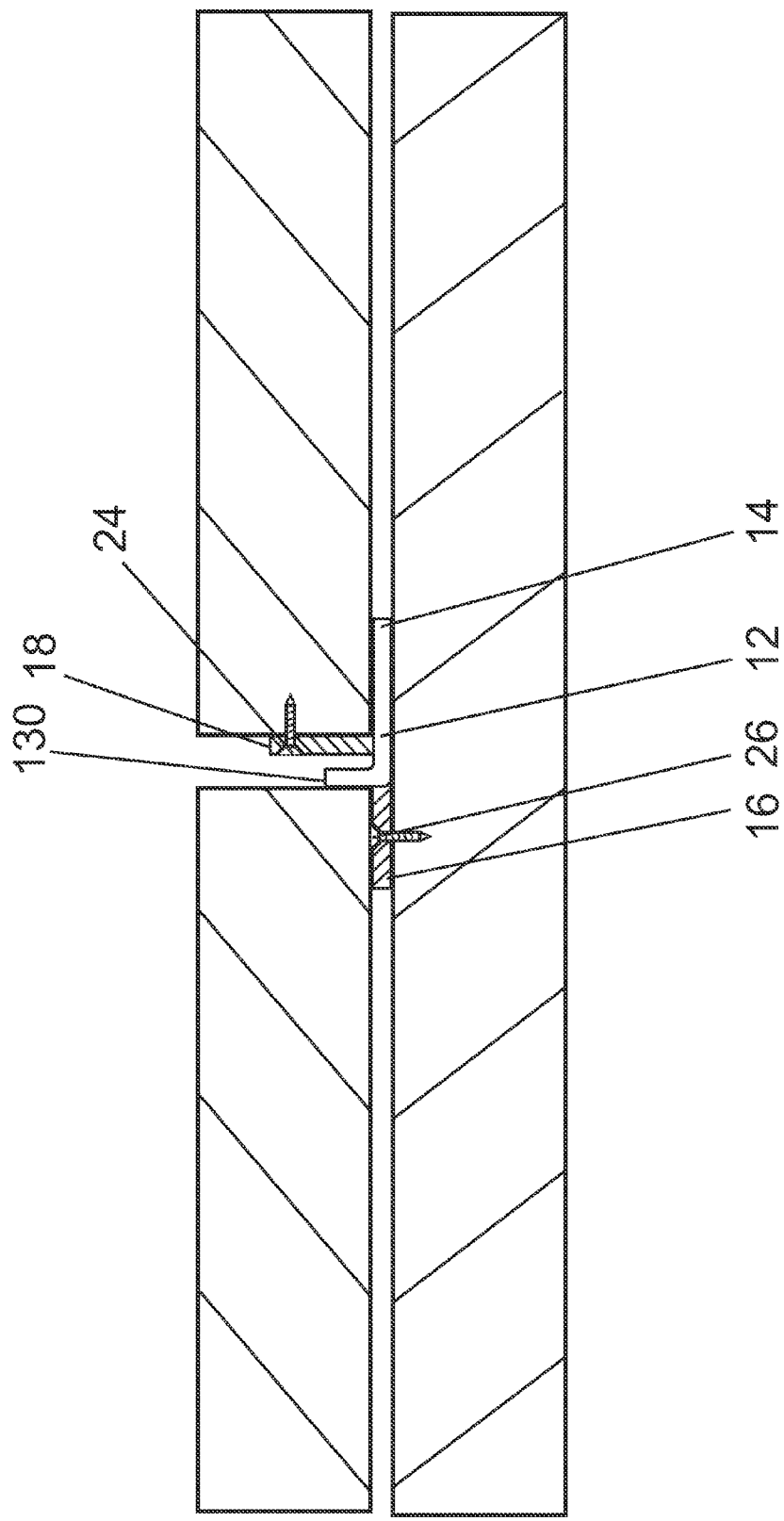
FIG. 5 is a cross sectional view of the decking system assembled using the second embodiment fastening device.

It will be readily understood that the fastener 110 of FIGS. 2 and 3 may be substituted for fastener 10, the difference being that the spacing between adjacent decking members is set by the thickness of the vertical tabs and the spacing between the bend lines as shown in FIG. 5.

Although conventional screws are used as illustrative fasteners, and are probably the preferred fastener, one skilled in the art will know of equivalents that can be substituted. The person of ordinary skill will also appreciate that an exemplary embodiment effectuates a much improved deck fastening device, system and method which conceals the deck fastening devices to improve the aesthetic appeal of the deck and help prevent injuries of persons using the deck. The deck fastening device, system and method also inhibits the movement of decking members and assures continuous proper spacing of the decking members that assures appropriate drainage through the decking members and prevents the growth of mold.

Having shown and described exemplary embodiments, those skilled in the art will realize that many variations and modifications may be made while remaining within its scope. Thus, many of the elements indicated above may be altered or replaced by different elements which will provide the same result and fall within the spirit of the claims.

What is claimed is:

1. A device for fastening structural deck members which are adjacent and parallel to each other to a transverse underlying joist structure comprising:
   a base plate with first and second ends and a thickness; and
   a first vertical tab, integral with, and bent upwardly along a first bend line from an interior portion of the base plate, the bend occurring in a first direction to form a first interior angle between the first vertical tab and the second end of the base plate, a first fastener-receiving hole positioned in the first vertical tab,
      wherein a second fastener-receiving hole is positioned in the base plate between the first bend line and the second end,
   a second vertical tab, integral with, and bent upwardly along a second bend line from a first side edge of the base plate; and
   a third vertical tab, integral with, and bent upwardly along a third bend line from a second side edge of the base plate,
   wherein the second and third bend lines are co-linear and positioned between the first bend line and the second end, the bends each occurring in second direction opposite the first direction to form respective second and third interior angles between the respective second and third vertical tabs and the first end of the base plate.

2. The device of claim 1, wherein:
   the second and third bend lines are each parallel to the first bend line and spaced at a predetermined distance therefrom.

3. The device of claim 1, wherein the first and second fastener-receiving holes are countersunk for engaging a head of a fastener.

4. A decking system, comprising:
   a plurality of joists;
   a plurality of decking members;
   a plurality of the fastening devices of claim 1; and
   a plurality of fasteners,
   wherein the joists are laid out in spaced-apart relationship and the decking members are fastened in a spaced-apart side-by-side manner to an upper surface of the joists using the fastening devices and the fasteners, such that the base plate of each fastening device is fastened to one of the upper joist surfaces and the first vertical tab of the fastening device is attached to a side face of one of the decking members, the spacing between adjacent decking members being determined by the thickness of the vertical tabs and the spacing between the bend lines and the spacing between the underside of the decking member and the top of the joist structure is determined by the thickness of the base plate.

5. A method
for assembling a decking structure, comprising the steps of:
   providing a base comprising a plurality of spaced-apart joists, each joist having an upper surface;
   providing a plurality of decking members;
   providing a plurality of fastening devices of claim 1;
   affixing a first of a plurality of decking members across the plurality of joists to serve as a reference member by any known fastening means;
   affixing a plurality of the fastening devices along a first side of a second decking member using a fastener that passes through the first fastener-receiving hole such that the first vertical tab of each fastening device is fastened to the first side and the first end of the base plate abuts a bottom surface of the second decking member, with the second end of each fastening device extending outwardly from the second decking member;

aligning the second decking member into proper spacing from the reference member by positioning the first side of the second decking member adjacent to a side of the reference member, such that the second ends of the fastening devices on the second decking member abut a bottom surface of the reference member and the spacing between the second decking member and the reference member is set by the thickness of the vertical tabs and the spacing between the bend lines;

attaching a plurality of the fastening devices of claim 1 along a second side of the second decking member using a fastener that passes through the first fastener-receiving hole such that the first vertical tab of each fastening device is fastened to the second side and the first end of the base plate is interposed between a bottom surface of the second decking member and one of the joists, with the second end of each fastening device extending outwardly from the second decking member along the second side atop one of the joists and then fastening each fastening device to the joist by using a fastener through the second fastener-receiving hole; and attaching additional decking members by placing a first side of the additional decking member along an attached second side of previously attached decking member by repeating the attaching step used with the second decking member.

\* \* \* \* \*